Oct. 11, 1932.     B. M. HESS     1,881,576
MIRROR EQUIPPED CABINET DOOR
Filed Oct. 20, 1930
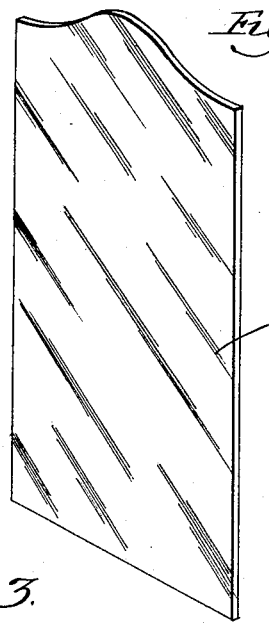
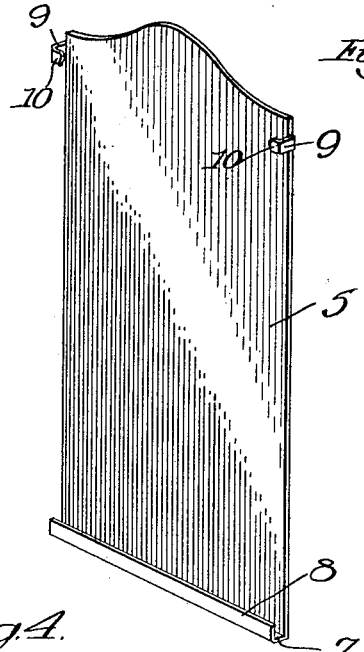
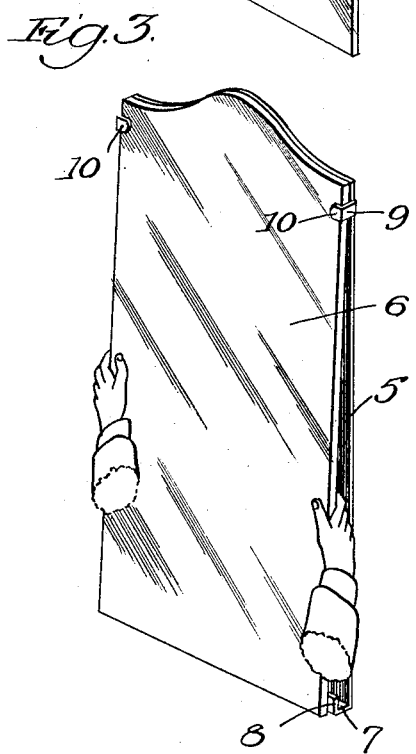
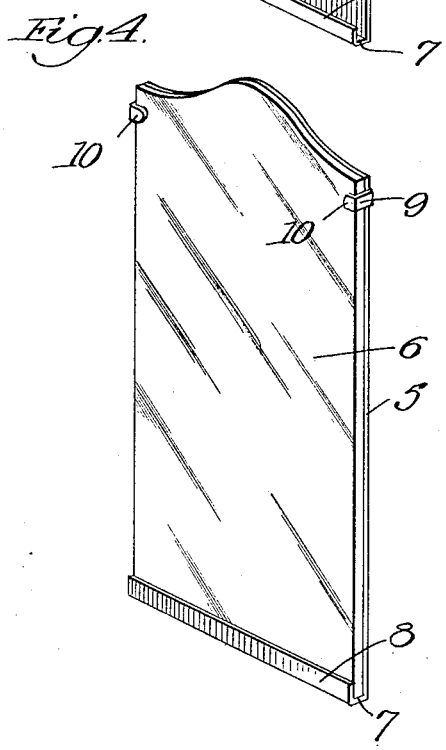
Inventor:
Bruce M. Hess,
By Dyrenforth, Lee, Chritton & Wiles
Attys.

Patented Oct. 11, 1932

1,881,576

UNITED STATES PATENT OFFICE

BRYCE M. HESS, OF CHICAGO, ILLINOIS

MIRROR-EQUIPPED CABINET DOOR

Application filed October 20, 1930. Serial No. 490,059.

My invention relates to doors for cabinets of the type formed of a backing member, usually in the form of a plate of substantially the same area as the opening for which it is to form the closure and hinged to the side wall of the cabinet, and a mirror portion applied to the backing member to extend over the same.

As cabinet doors have hitherto been constructed the mirror is held in place on the backing member by bolts, or the like, extending through openings in the mirror portion and provided with heads, commonly in the form of rosettes, exposed at the outer surface of the mirror portion.

Such form of construction is not only expensive and the continuity of the reflecting surface of the mirror interrupted by the fastening devices, but oftentimes difficulty is presented in the assembling of the mirror portions with the backing members at the place where the cabinets are to be set up, it being the common and preferred practice to ship the mirror portions and the backing members in disassembled condition to the place where the cabinets are to be installed.

My object is to provide a construction of the character above referred to by which the use of fastening devices extending through holes in the mirror portion is avoided; and the mirror portions may be assembled to operative position on the backing members with great ease, expeditiously, and without requiring skill on the part of the workmen.

Referring to the accompanying drawing:

Figure 1 is a perspective view of a glass mirror forming an element of the door of a cabinet.

Figure 2 is a perspective view of a backing member forming another element of the door and with which the mirror of Fig. 1 is to be assembled.

Figure 3 is a perspective view of the manner of assembling the mirror and backing member; and Figure 4, a perspective view of the mirror and backing member in fully assembled relation.

Referring to the construction shown, a backing member forming an element of a cabinet door is represented at 5, this backing member, as is common with backing members now in use, being of a size and shape preferably to completely cover the opening in the front of the cabinet casing (not shown) and, as is common in practice, would have secured thereto along one vertical edge one of the leaves of each hinge by which the door is hingedly connected with the cabinet casing, the other leaves of the hinges referred to being secured to the cabinet casing in accordance with common practice.

The backing member 5 is provided along its lower edge with a seating portion upon which the mirror section of the door and represented at 6, would rest and be held against forward displacement, this seating portion, in the particular construction shown, being in the form of a ledge 7 extending forwardly and across the lower edge of the member 5 and provided with an upturned flange 8, spaced from the body portion of the member 5 as shown. By preference this flanged edge is formed integrally with the body member as by bending the lower edge of the latter into the shape shown.

The backing member 5 is also provided at its vertical edges adjacent the top thereof with lugs 9 presenting inturned end portions 10 which are spaced from, and overlie, the body portion of the member 5, these lugs forming, with said body portion, channels into which the mirror 6 extends at the upper portion of its side edges as shown in Fig. 4, whereby the mirror 6 is held against forward displacement at its upper end and also against lateral displacement.

In assembling the mirror 6 with the backing, the mirror is first slid at the end thereof which extends at the top of the door in the finished structure, into the channels provided by the lugs as shown in Fig. 3, and movement in this direction continued until the opposite edge of the mirror clears the flange 8 whereupon the mirror is then moved toward and against the backing member and the mirror 6 then slid back to seat it on the ledge 7, and to the rear of the flange 8 as shown in Fig. 4.

The provision of the flanged seating portion at the bottom of the backing member 5 and the lugs 9 adjacent its upper portion, causes the mirror to be held against downward, forward, and lateral displacement on the backing member when the door structure is positioned substantially vertically as it is when hingedly mounted on the cabinet for which it is to form a closure.

It will be understood from the foregoing that the mirror may be assembled with the backing member, with comparative ease and quickly and when so assembled will be held securely against displacement.

It is preferred that the seating portion at the lower end of the backing member 5 be formed of the ledge 7 and flange 8 which extend continuously throughout the entire width of the member 5, inasmuch as this channel construction not only forms a desirable seat for the mirror but stiffens the backing member.

It will be understood that if desired the seating portion at the bottom of the backing member 5 instead of being formed of a continuous member as shown and above described may be formed of spaced apart lugs similar to the lugs 9.

While I have illustrated and described a particular embodiment of my invention and a suggested modification thereof, I do not wish to be understood as intending to limit my invention thereto as the same may be variously modified and altered without departing from the spirit of my invention.

What I claim as new, and desire to secure by Letters Patent, is:

1. A device of the class described comprising a backing member adapted for vertical disposition, mirror-supporting means on the backing member engageable by the lower end of the mirror, lug means on the backing-member spaced above said supporting means and overlapping the front of the mirror, the mirror-overlapping part of the lug means being spaced from the backing a greater distance than the thickness of the mirror, the construction thus permitting the mirror while inclined to be inserted beneath the lug means from below and moved upwardly above the supporting means and thence inwardly at the bottom and on to said supporting means whereby the mirror is applied to the backing-member through minimum movement to avoid injury to the silvering of the mirror.

2. A device of the class described comprising a backing member adapted for vertical disposition, mirror-supporting means on the backing member engageable by the lower end of the mirror, lugs on the backing member spaced above said supporting means and between which the mirror extends and having portions overlying the front of the mirror at the side edge portions of the latter, said portions being spaced from said backing member a greater distance than the thickness of the mirror to permit the mirror while inclined to be inserted beneath said portions of said lugs from below and moved upwardly above the supporting means and thence inwardly at the bottom and onto said supporting means, whereby the mirror is applied to the backing member through minimum movement to avoid injury to the silvering of the mirror.

3. A device of the class described comprising a backing member adapted for vertical disposition, mirror-supporting means on the backing member engageable by the lower end of the mirror, lugs on the backing member spaced above said supporting means and between which the mirror extends and having portions overlying the front of the mirror at the side edge portions of the latter adjacent the upper portion of the mirror, said portions being spaced from said backing member a greater distance than the thickness of the mirror to permit the mirror while inclined to be inserted beneath said portions of said lugs from below and moved upwardly above the supporting means and thence inwardly at the bottom and onto said supporting means, whereby the mirror is applied to the backing member through minimum movement to avoid injury to the silvering of the mirror.

BRYCE M. HESS.